April 26, 1932.   T. R. HARRISON   1,856,039
INTEGRATING MECHANISM FOR METERING INSTRUMENTS
Filed July 27, 1929   3 Sheets-Sheet 1
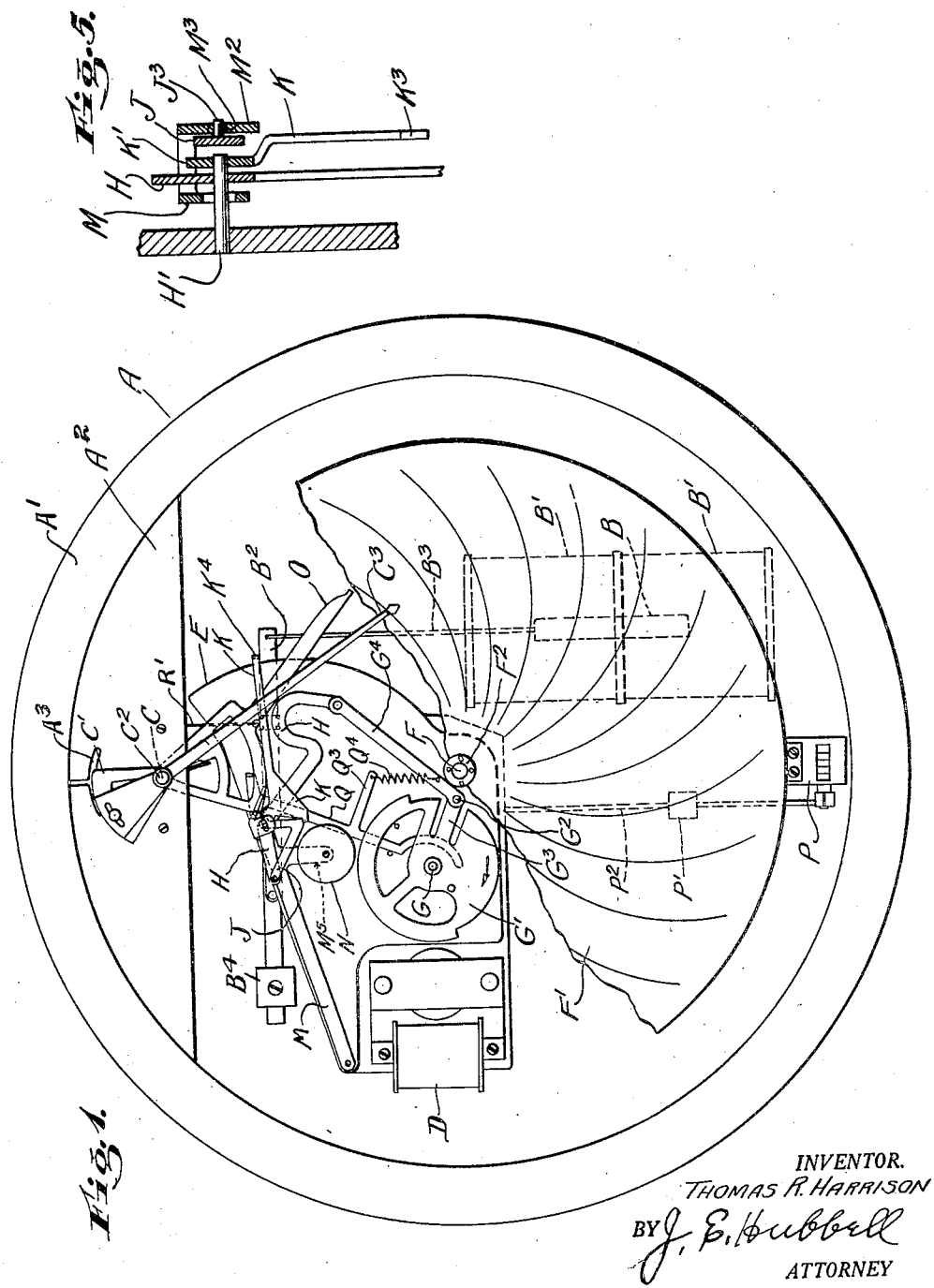
INVENTOR.
THOMAS R. HARRISON
BY J. E. Hubbell
ATTORNEY

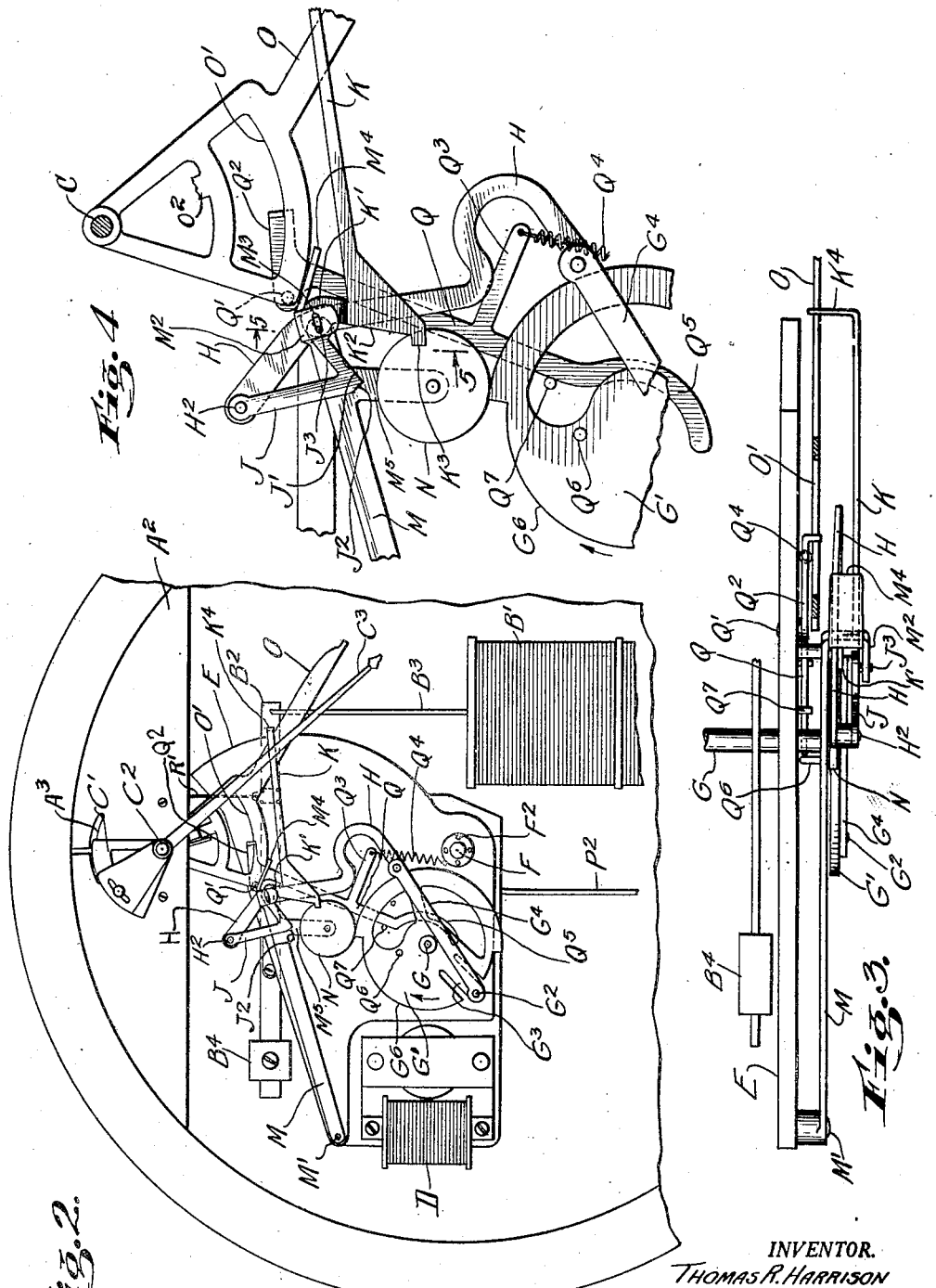

April 26, 1932.   T. R. HARRISON   1,856,039
INTEGRATING MECHANISM FOR METERING INSTRUMENTS
Filed July 27, 1929    3 Sheets-Sheet 3
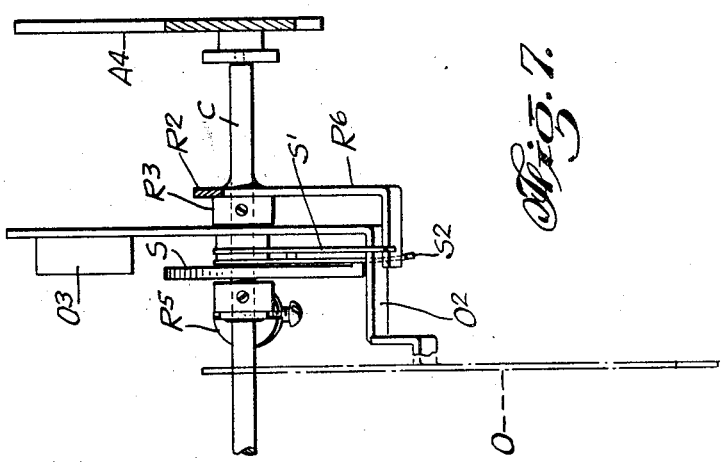
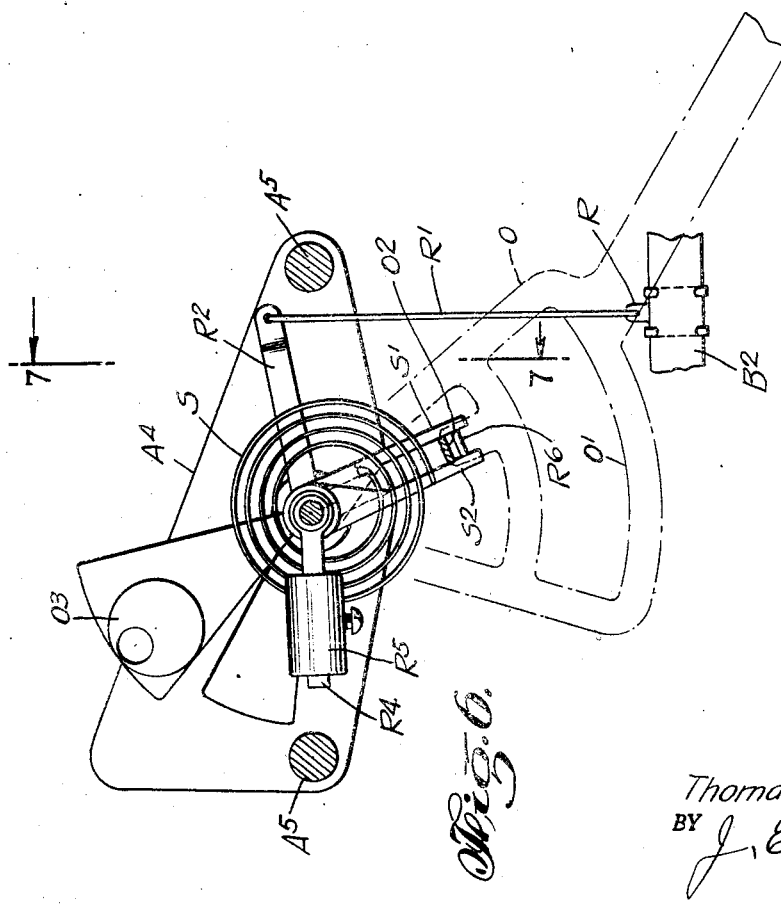
INVENTOR.
Thomas R. Harrison
BY J. E. Hubbell
ATTORNEY Patented Apr. 26, 1932

1,856,039

UNITED STATES PATENT OFFICE

THOMAS R. HARRISON, OF WYNCOTE, PENNSYLVANIA, ASSIGNOR TO THE BROWN INSTRUMENT COMPANY, OF PHILADELPHIA, PENNSYLVANIA, A CORPORATION OF PENNSYLVANIA

INTEGRATING MECHANISM FOR METERING INSTRUMENTS

Application filed July 27, 1929. Serial No. 381,623.

The present invention relates to metering instruments, and particularly to metering instruments in which an integrating mechanism is incorporated. Such instruments usually comprise indicating and/or recording mechanism operated in conjunction with the integrating mechanism. The general object of my invention is to provide an improved construction and arrangement of the operating mechanism of a metering instrument of the above type, and particularly, to provide an improved form of integrating mechanism, which is characterized by its simplicity of construction and mode of operation and reliability. A further and more specific object of my invention is to provide improved automatic means for periodically holding an element of the meter mechanism which moves in accordance with changes in the quantity metered, fixed in position for a predetermined interval, during which it is engaged by a moving part of the integrating mechanism, which engagement operatively actuates other portions of the integrating mechanism. Another specific object of my invention is to provide improved connecting means normally effecting simultaneous and corresponding movements of a meter element and recording element, but permitting relative movements of said elements during a periodic interval in which one of said elements is restrained from movement.

The various features of novelty which characterize my invention are pointed out with particularity in the claims annexed to and forming a part of this specification. For a better understanding of the invention, however, and the advantages possessed by it reference should be had to the accompanying drawings and descriptive matter in which I have illustrated and described a preferred embodiment of the invention.

Of the drawings:

Fig. 1 is an elevation of a metering instrument showing a portion of the integrating mechanism in one operating position;

Fig. 2 is a similar elevation showing the integrating mechanism in a second position;

Fig. 3 is an enlarged plan view of a portion of the mechanism of Fig. 2;

Fig. 4 is an enlarged elevation of a portion of the mechanism shown in Fig. 2 in a new position;

Fig. 5 is a section on the line 5—5 of Fig. 4;

Fig. 6 is an elevation with the chart plate removed of the mechanism at the rear thereof; and Fig. 7 is a section on the line 7—7 of Fig. 6.

In the drawings a metering instrument A is illustrated which is particularly adapted to form the exhibiting portion of a flow metering system such as is disclosed in my Patent No. 1,743,853, granted January 14, 1930, on an application filed December 29, 1925. The instrument A comprises recording and integrating sections, the mechanism of which, when the instrument is used for measuring a fluid flow, is actuated by a differential pressure device of a well known character. The recording and integrating instrument A illustrated comprises an axially movable magnetic body of core B which is moved by the changes in inductance of a pair of end to end coil sections B', in which it is positioned and which form part of an impedance bridge transmitting system connecting the differential pressure device and instrument, arranged and operating as disclosed in my prior application.

The instrument has a casing A' in which is contained the instrument mechanism comprising a short horizontal pen arm or rock shaft C, mounted at the rear of a chart plate $A^2$ for oscillatory movements corresponding to the axial movements of the core B, the position of which depends upon the instantaneous value of the quantity metered. The rear end of the shaft C is rotatably mounted in a base plate $A^4$ which is spaced from and secured to the chart plate by posts $A^5$. The connections between the core and rock shaft comprise a bell crank lever or rocker arm $B^2$ pivotally mounted on and at the rear side of a plate E, which is supported by the instrument casing. The lever $B^2$ is arranged with one end connected to the stem $B^3$ of the core B and an adjacent portion connected to the rock shaft C as hereinafter described. An adjustable counter-weight $B^4$ is connected to the opposite end of the lever B² and balances this portion of the mechanism against gravity. In the instrument framework is rotatably mounted a horizontal shaft F carrying a record chart F', secured thereon by a chart knob F². The chart shaft F is slowly rotated at a constant speed by any suitable means, such as a synchronous electric motor D mounted in the meter casing and connected by a train of gearing (not shown) to the chart shaft.

An inverted U-shaped arm C' is connected to the front end of the rock shaft C and arranged to project through an arcuate slot A³ in the chart plate over the edge of the chart F'. The arm is provided in front of the chart plate with a stud shaft C², co-axial with the shaft C and on which a recording pen arm C³ is secured for tracing a continuous record of the value of the quantity metered on the chart F'. The pen arm is adjustably mounted on the shaft C² for purposes of calibration.

With the mechanism heretofore described the variations in the rate of fluid flow may be electro-magnetically transmitted to the core B in the inductance coil B' and the movements of the core effected by such variations cause corresponding oscillatory movements of the rock shaft C and stud shaft C². The chart F' being rotated at a constant speed, usually one revolution every twenty-four hours, causes the chart to be moved relative to the pen arm C³, which swings across one side of the instrument in response to the movements of the stud shaft C², whereby a continuous record of the time and extent of variation in rate of fluid flow is made on the chart.

The integrating mechanism of the instrument, to which my invention more particularly relates, comprises a driving shaft G, which may be driven from the same motor D as the chart F, although at a considerably higher speed, such as one revolution per minute. The various gear arrangements by which the shafts F and G are connected to the driving motor are well known to those skilled in the art and a detailed description herein is unnecessary. A driving wheel or disc G' is mounted on the shaft G at the front side of the supporting plate E and provided with a crank pin G² secured on an outwardly bent tongue member G³. The disc through a link G⁴ causes a curved arm H, having an intermediate portion adjacent its upper end pivoted on a pin H' on the plate E, to oscillate across the face of the plate. The upper end of the oscillating arm H has a substantially L-shaped latch member J pivoted thereon at H².

The latch J is arranged to lock a tripper arm K in fixed relation with the oscillating arm H during one portion of each revolution of the disc G'. The tripper arm K extends substantially horizontally across a portion of the plate E and is formed with a vertically arranged slightly off-set projection K', the upper end of which is pivotally mounted on the pin H', as shown in Fig. 5. For interlocking purposes, the latch and tripper arm are formed with end surfaces adapted to engage in one position of the parts. The latch has end surfaces J' and J² adapted to contact, respectively, with an end surface K² and projection K³ of the tripper arm, as shown in Fig. 1.

A lever M is pivoted to the plate E at M' adjacent the driving motor D and as shown, is formed with its opposite end portion bent outwardly and rearwardly to form a projecting flange M². The outer side of the flange is formed with a slot M³ in which a pivot pin J³, carried by the latch member J, is positioned and on which the lever M rests. The pivot pins H' and J³ are substantially coaxial, as shown in Fig. 5, and the adjacent surfaces of the latch member J and tripper arm projection K' slightly separated. The outer end of the lever M is formed with a downwardly inclined projection M⁴ arranged to be engaged by the arm H during the relatching movement hereinafter described. The lever M is also provided with a depending tongue M⁵ on which a counter train driving roller N is rotatably mounted and arranged to be brought in frictional contact with the periphery of the driving disc G' once during each revolution of the shaft G, except when the shaft C² is in its zero position, the period of contact with the disc depending on the angular position of a tripping blade O.

As shown, the disc G' has a portion of its periphery cut away at each side of the crank pin G², the cut away edge G⁶ being concentric with the shaft G and extending about 180° on the disc periphery. The downward movement of the roller N being limited by the length and inclination of the slot M³, the roller and disc will be out of contact when the cut away edge G⁶ is beneath the roller.

As illustrated in Figs. 4, 6 and 7, the tripper blade O is pivotally mounted at its upper end on the rock shaft C at the rear of the chart plate A² and rigidly connected adjacent the shaft C with an L-shaped bracket O², also pivotally mounted on the rock shaft. The bracket is provided with a pivoted counter-weight O³ at its opposite end by which the tripper blade assembly is mechanically balanced. The lever B² is connected to the rock shaft C by a clip R and link R' pivotally connected to the clip and to one of the radial arms R² of a hub member R³ rigidly mounted on the shaft C. The shaft also carries an arm R⁴ on which a counterweight R⁵ is slidably arranged and whereby the recording pen arm assembly is mechanically balanced.

The tripper blade O and recording pen arm C³ are interconnected by provisions by which these elements move simultaneously angularly in the same directions about the axis of the shaft C but which permit relative angular movement under certain conditions. These provisions comprise a helical spring S surrounding the shaft C and having its inner and outer ends rigidly connected to a pair of shock absorber fingers S′ and S², respectively, pivotally mounted on the shaft C. The hub R³ has an L-shaped arm R⁶ extending parallel with the bracket O² with their respective horizontal portions slightly spaced apart and of the same width. The fingers S′ and S² extend substantially radially at opposite sides of and beyond the horizontal portions of the bracket O² and arm R⁶, whereby the bracket and arm portions are held in radial alignment and the tripper blade and shaft C are simultaneously and correspondingly movable in response to the movements of the armature B under the action of the spring and fingers.

With the foregoing portions of the mechanism constructed and arranged as described, the operation of the integrating mechanism is as follows: At the beginning of each operating cycle the latch member J is held by the tripping arm K in fixed relation with the oscillating arm H as shown in Fig. 1, the arm H being then at the limit of its counterclockwise movement about its supporting pin H′. As the shaft G continues its rotation, the link G⁴ causes the oscillating arm to begin a clockwise movement about the pin H′. The clockwise movement of the latter continues without change in the position of the parts J, K and H relative to one another until a finger K⁴ on the end of the tripper arm engages the upper edge of the tripper blade O. The point in the rotation of the disc G′ at which the finger and tripper blade contact depends on the angular position of the shaft C and magnetic core B at that instant. This engagement prevents a further clockwise movement of the tripper arm and on a continued clockwise movement of the arm H, the latch member and tripper arm are relatively moved out of the interlocking position. The unlocking action permits the lever M and roller N to drop due to the weight of the parts.

When the roller N drops into engagement with the raised peripheral portion of the disc G′ it continues in engagement therewith and is thereby rotated until the continued rotation of the disc carries it out of contact with the roller. The rotary movements given to the roller N by the disc G′ are summed up by a counting train or revolution counter P located in the lower part of the instrument framework and connected to the roller by suitable mechanism, of which various forms are disclosed in my above mentioned Patent No. 1,743,853. For example, that mechanism may comprise a gear and ratchet wheel arrangement for operating a lever connected to a link P², the parts being held in engagement by a weight P′ mounted on the link P², which is connected to the counter P. The rotative movement given the roller N on each engagement with the disc G′ is proportional to the angular position of the shaft C at the time when the tripper blade O is engaged by the tripper arm K. While the point of engagement of the tripping arm K and blade O varies for the angular position of the latter, the engagement of the roller and disc ends at the same point in each revolution regardless of lost motion in the tripping mechanism. As the oscillating arm H starts its movement in the counter clockwise direction and approaches the initial postion shown in Fig. 1, the latch J and tripping arm K again come into contact, with the surface J′ contacting with the end of the projection K³. On a further movement, the arm H engages the projection M⁴ on the lever M causing the latter and the latch member J to rise, which movement permits the projection K³ to fit under the surface J² effecting an interlocking action of the latch J and tripper arm K, and thus restoring the parts H, J and K in their original relative positions.

Since the blade O and tripping arm K turn about displaced axes it will be apparent that for each different angular position of the shaft C the finger K⁴ will engage the edge of the blade O at a different point along the length of the blade. In consequence of this fact it will be readily apparent to those skilled in the art that the blade edge may readily be shaped so that whatever the position of the blade may be when the roller N drops into engagement with the disc, the resultant rotative movement of the roller will be proportional to the then rate of flow. With the proper relative disposition of the parts as shown in the drawings the edge of the blade O may be substantially a straight edge without giving rise to any appreciable or significant error in the integration obtained. This fact obviously facilitates the manufacture and calibration of the instrument.

In the operations described, it is obvious that the movement of the tripper arm into contact with the tripper blade tends to move the latter downwardly and thereby cause an inaccurate integrating record. By my present invention, improved provisions are made for holding the tripper blade fixed in position during a predetermined portion of each revolution of the disc G′, during which period the tripper arm and blade come into contact to actuate the integrator mechanism. These provisions comprise an arcuate extension O′ extending laterally from the tripper blade adjacent its upper end and a clamping member Q automatically operated to hold the tripper blade sector O' during the clockwise or downward movement of the oscillating arm H.

The clamping member is pivoted on a stud Q' on the plate E at the upper end of the member Q. That portion of the clamping member is provided with a lateral finger $Q^2$, the free end of which extends forwardly over the smooth upper edge of the sector O'. The clamping member is further provided with a lateral projection $Q^3$ adjacent its lower end. The free end of the projection is connected to a tension spring $Q^4$ secured to the plate E at a point adjacent the shaft F. With this arrangement of the parts the locking finger $Q^2$ tends to be maintained in contact with the sector O' at all times due to the action of the spring $Q^4$. The lower end of the locking member has a downwardly extending arcuate portion $Q^5$, which is arranged to be engaged by an unlocking pin $Q^6$ during periodic intervals. The pin $Q^6$ is mounted on the disc G' at the rear side of the latter and in substantial radial alignment with the beginning of the cut away portion $G^6$ of the disc. The normal clamping position of the member Q is partly determined by a stop $Q^7$, limiting the clockwise movement of the clamp under the action of the spring $Q^4$.

With the clamping means for periodically locking the tripper blade in position constructed and arranged as described, the operation is as follows: in the position of the parts as shown in Fig. 1, the clamping member is in the locking position with the finger $Q^2$ in contact with the sector O' and the oscillating arm H moving in the clockwise direction. The position of the pin Q' and the tension of the spring $Q^4$ is proportioned so that the contact between the finger and sector is sufficient to prevent further movement of the blade when engaged by the tripper arm, but insufficient to cause any distortion of the parts.

During the clockwise movement of the arm H, the tripper arm engages the blade and the integrating mechanism is actuated. The blade locking action continues until the unlocking pin $Q^6$ contacts with the periphery of the arcuate section $Q^5$ of the clamping member. A continuation of this movement causes the clamping member to move in the counter clockwise direction about its pivot point Q', thereby raising the finger $Q^2$ out of contact with the sector O'. The clamping finger remains in the raised position as long as the pin $Q^6$ acts on the arcuate section $Q^5$. When the pin passes out of contact with the end of the clamping member, the clamping member is restored to its locking position under the action of the spring $Q^4$. In the present embodiment the tripper blade is locked during substantially the whole clockwise movement of the oscillating arm H and unlocked during the counter clockwise movement.

While the tripper blade O is in its locked position, the pen arm $C^3$ is substantially free to move relatively thereto about the axis of the shaft C in response to any changes in value of the quantity metered occuring during this period. Such relative movement is possible due to the type of connection between the pen arm and tripper blade. The restraining force of the shock absorber mechanism on the arm $R^6$ and consequently on the pen arm $C^3$ is almost negligible when compared with the force exerted by the armature B through the link R' tending to move the pen arm angularly. When the tripper blade is again unlocked, it is promptly moved under the action of the spring mechanism to its proper position relative to the pen arm and thereafter is simultaneously moved therewith until the next locking action by the clamping member Q occurs.

The integrating mechanism herein disclosed is characterized by its simplicity of construction, accuracy in operation, and low power consumption. The various moving parts are arranged to operate with comparatively few wearing surfaces, whereby periodic replacement of the parts is largely avoided. The movement of the clamping means into and out of its locking position is advantageously gradual to avoid displacement of the tripper blade at such times.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention what I claim as new and desire to secure by Letters Patent is:

1. In an integrating meter, the combination of a meter element arranged to turn about an axis in response to changes in value of a quantity metered, a member adapted to turn about a second axis laterally displaced from the first mentioned axis, means for periodically moving said member about said axis into the normal path of movement of said element, means comprising a locking part movable into and out of locking engagement with said element and held stationary while in such engagement for automatically locking said element during a substantial portion of the period of movement of said member to prevent its displacement on an engagement by said member, and a mechanism selectively actuated by the engagement of said member with said element in accordance with the position of the latter.

2. In an integrating meter, the combination of a meter element arranged to turn about an axis in response to changes in value of a quantity metered, a member adapted to turn about a second axis laterally displaced from the first mentioned axis, means for periodically moving said member about said axis into the normal path of movement of said element, means for automatically locking said element during a portion of the period of movement of said member to prevent its displacement on an engagement by said member, said last mentioned means including a normally stationary clamping member adapted to be moved into locking contact with said element, and a mechanism selectively actuated by the engagement of said member with said element in accordance with the position of the latter.

3. In an integrating meter, the combination of a meter element arranged to turn about an axis in response to changes in value of a quantity metered, a member adapted to turn about a second axis laterally displaced from the first mentioned axis, means for periodically moving said member about said second axis into the normal path of movement of said element, means for periodically locking said element against movement to prevent its displacement on engagement by said member including a pivoted clamping member movable into and out of locking engagement with said element and held stationary while in such engagement, and a mechanism selectively actuated by the engagement of said member with said element in accordance with the position of the latter.

4. In an integrating meter, the combination of a meter element arranged to turn about an axis in response to changes in value of a quantity metered, a member adapted to turn about a second axis laterally displaced from the first mentioned axis, means for periodically moving said member about said second axis into the normal path of movement of said element, means for periodically locking said element against movement to prevent its displacement on engagement by said member, said last mentioned means including a pivoted clamping member normally tending to occupy a stationary position in which it is in locking engagement with said element and means associated with said first mentioned means for periodically moving said clamping member to an unlocking position, and a mechanism selectively actuated by the engagement of said member with said element in accordance with the position of the latter.

5. In an integrating meter, the combination of a blade-like meter element moving in response to changes in value of a quantity metered, a driving element, a member connected to said driving element for regularly recurring synchronous cyclic movements, a tripper arm adapted to be moved into engagement with said meter element by said member at a stage in said cyclic movement of the latter depending on the position of said meter element, means for maintaining said meter element fixed in position while engaged by said tripper arm including an arcuate sector formed on said meter element, a pivoted clamping member, and spring means tending to move said clamping member into engagement with said meter element sector, and means on said driving element for periodically effecting a pivotal movement of said clamping member.

6. In an integrating meter, the combination of a plurality of meter elements arranged for corresponding movements in response to changes in value of a quantity metered, driving means connecting said elements for said movements, and means for intermittently locking one of said elements in a fixed position, said driving means permitting relative movement of said elements during said locking period.

7. In an integrating meter, the combination of a meter element arranged for angular movements, means for moving said element in response to changes in value of a quantity metered, a second meter element arranged for angular movements, connecting means tending to maintain said elements in a relative position at all times, and means for periodically locking said second element in a fixed position, any movements of said first mentioned means occurring during said locking period being sufficient to move said first meter element relative to said second element.

8. In an integrating meter, the combination of a rotatable shaft having angular movements corresponding to changes in value of a quantity metered, a meter element pivotally mounted on said shaft, a spring driving connection between said shaft and element arranged to give corresponding movements to said meter element, and means periodically opposing the action of said driving connection and tending to hold said meter element in a fixed angular position.

9. In an integrating meter, the combination of a meter element arranged to turn about an axis in response to changes in value of a quantity metered, with a second meter element arranged for angular movement about the same axis, means tending to maintain simultaneously corresponding angular movements of said elements, and separate means for periodically restraining said second meter element from angular movement, said first mentioned means permitting relative movement of said first meter element while said second meter element is restrained.

10. In an integrating meter, the combination of a shaft arranged for angular movements in response to changes in value of a quantity metered and having an exhibiting arm connected thereto and moving therewith, a tripper blade element pivotally mounted on said shaft, and means for normally effecting simultaneous corresponding movements of said exhibiting arm and blade element comprising a helical spring mounted on said shaft and radial fingers pivotally mounted on said shaft and connected to opposite ends of said spring, said fingers being arranged to hold said exhibiting arm and blade element in a fixed relative position, means periodically restraining said element against movement, and means selectively controlled by the position of said element when so restrained.

11. In an integrating meter, the combination of a shaft arranged for angular movements in response to changes in value of a quantity metered, an exhibiting arm connected to said shaft and movable therewith, a tripper blade pivotally mounted on said shaft, a counter-weight arm secured to said tripper blade, a second arm rigidly connected to said shaft and having a portion in radial alignment with a portion of said counter-weight arm, and spring operated means for holding said portions in radial alignment, whereby normally said exhibiting arm and tripper blade are simultaneously and correspondingly moved when said shaft is turned, means periodically restraining said blade against movement, and means selectively controlled by the position of said blade when so restrained.

Signed at Philadelphia, in the county of Philadelphia and State of Pennsylvania, this 25th day of July, A. D. 1929.

THOMAS R. HARRISON.